Patented June 29, 1948

2,444,301

UNITED STATES PATENT OFFICE 2,444,301

METHOD OF PREPARING GAMMA-ACETO-PROPANOL AND GAMMA-VALEROLACTONE

Lucas P. Kyrides and Ferdinand B. Zienty, St. Louis, Mo., assignors to Monsanto Chemical Company, St. Louis, Mo., a corporation of Delaware No Drawing. Application July 11, 1945, Serial No. 604,531

20 Claims. (Cl. 260—594)

This invention relates to the preparation of keto alcohols and lactones and particularly to a method of preparing gamma-acetopropanol and gamma-valerolactone from 1,4-pentanediol.

This application is a continuation-in-part of our co-pending application, Ser. No. 553,289, filed September 8, 1944, now abandoned.

The dehydrogenation of glycerol by heat treatment in the presence of copper chromite as a catalyst results in the formation of hydroxy-propanone (acetol). Likewise, the dehydrogenation of 1,3-butylene glycol by heat treatment in the presence of basic copper carbonate results in the formation of acetoethanol. Consequently, the dehydrogenation of 1,4-pentanediol by heat treatment in the presence of copper chromite would be expected by analogy to form gamma-acetopropanol. We have discovered, however, that this process results in the formation of gamma-valerolactone with only traces of gamma-acetopropanol. Moreover, various promoters of the alkaline type, such as sodium hydroxide and sodium carbonate, and other promoters, such as decolorizing charcoal and Alundum, merely serve to increase the yield of gamma-valerolactone. The dehydrogenation of 1,4-pentanediol by means of a copper chromite catalyst formed by precipitation of the metal salts in the presence of crushed, inert, porous silica filter stone and subsequently drying and roasting the catalyst resulted in very poor yields of gamma-acetopropanol and relatively high yields of gamma-valerolactone.

The object of the present invention is to provide a novel process for the preparation of gamma-acetopropanol and gamma-valerolactone from 1,4-pentanediol.

Other objects will become apparent from the following specification and examples.

The method of the present invention, generally stated, comprises heating 1,4-pentanediol with a copper chromite catalyst containing an active form of silica having a surface area of at least 5 square meters per gram of silica, and simultaneously slowly distilling off the reaction products and water. During the heating operation hydrogen is evolved from the reaction mixture. The distilled reaction products are then slowly redistilled, in such a manner that the temperature of the condensing vapors does not exceed 110° C. In this manner, gamma-acetopropanol is decomposed into water and 2-methyl-4,5-dihydrofuran and these components are distilled over, leaving gamma-valerolactone and some unreacted 1,4-pentanediol in the still. The distillate consists of two layers which are identified as a lower water layer and an upper layer of 2-methyl-4,5-dihydrofuran. The two layers are allowed to stand together at room temperature with occasional agitation until a homogeneous solution is obtained. By the addition of a small quantity of an acid, for example, approximately 1 cc. of $\frac{1}{60}$ normal hydrochloric, sulfuric or acetic acid, to the receiver prior to or during the slow distillation, the recombination of the water with the 2-methyl-4,5-dihydrofuran to form gamma-acetopropanol takes place substantially as soon as the two components are distilled into the receiver. It is desirable to add the acid before a large volume of distillate is formed, since otherwise the recombination may be accompanied by violence. The resulting solution is then distilled under reduced pressure. The distillate is gamma-acetopropanol. The high boiling residue from the redistillation of the distilled reaction products is subsequently distilled to recover gamma-valerolactone. The remaining residue may be further distilled to recover residual unreacted 1,4-pentanediol.

By active silica incorporated in the copper chromite catalyst in the process of the present invention is meant a form of silica having a surface area of at least 5 square meters per gram of silica. The table shows several forms of silica, the corresponding surface areas in square meters per gram of silica and the average yields of gamma-acetopropanol obtained when the respective types of silica are employed in the process of the present invention with a copper chromite catalyst in the dehydrogenation of 1,4-pentanediol.

Table

|  | Surface area (sq. m./g.) | Yield of gamma-acetopropanol |
|---|---|---|
| Silica gel (highly activated) | 580–600 | Above 35%. |
| Silica gel | 400 | Above 35%. |
| Silica gel prepared as an aerogel or by evaporation of an ion-deplenished silica sol | 200–400 | Above 35%. |
| Colloidal and semi-colloidal Ottawa sand (wet ground) | 5–6 | 30% or more. |
| Pulverized quartz | 5–6 | 30% or more. |
| Ottawa sand (through 180 mesh) | 0.87 | 16–18%. |
| Crushed inert porous silica filter stone | 0.05 | 13–15%. |
| Ottawa sand (200 mesh) | 0.037 | 13–15%. |

The surface area of specimens of the aforescribed forms of silica were measured by low temperature gas adsorption according to the method described by Emmett and Brunauer in J. A. C. S. 59, 1553 (1937).

It has been found that a yield of at least 20%, and desirably 30% or more, of gamma-acetopropanol from the dehydrogenation of 1,4-pentanediol is necessary in order to render the process commercially feasible in competition with other methods for making gamma-acetopropanol, whereas below a 20% yield the process cannot readily be made to compete commercially with competitive methods. By the process of the present invention, satisfactory yields are possible.

As an alternative embodiment of the present invention small amounts of mineral or organic acids, such as sulfuric, acetic, lauric, sebacic, stearic, caproic, 2-ethyl hexoic and phenyl acetic acids, may be incorporated in the 1,4-pentanediol starting material, and the resulting mixture may then be heated under reduced pressure for a short period, for example at 90° C. and 25 mm. for a few minutes, prior to the addition of the copper chromite-silica catalyst. The purpose of this pre-treatment is to remove air from the pentanediol mixture and possibly produce some degree of esterification between the acid and the pentanediol. This alternative procedure tends to render the yield of gamma-acetopropanol in the subsequent dehydrogenation more nearly uniform from batch to batch. The resulting solution is cooled under reduced pressure approximately to room temperature and thereafter brought to atmospheric pressure. The catalyst is then added and the reaction is conducted as described hereinbefore. The addition of small quantities of acid in this manner appears to have only a slight effect in increasing the yield of gamma-acetopropanol.

In the preparation of gamma-acetopropanol by the method of the present invention, the still in which the dehydrogenation is conducted may be re-charged as many as five times or more after each previous yield of gamma-acetopropanol and gamma-valerolactone is distilled over. In this manner, the catalyst may be used repeatedly without the necessity of starting with a fresh batch of catalyst. The catalyst may generally be employed for successive batches in this manner until the yield of gamma-acetopropanol on successive operations decreases to an uneconomical level.

In the slow redistillation of the crude mixture recovered from the catalytic reaction, the preferred practice is to maintain the temperature of the condensing vapors below 110° C. In this manner, the condensing vapors will be substantially free from gamma-valerolactone which distills over at higher temperatures. As an alternative, however, the temperature may be as high as 150° C., or even 205° C., or just below the vapor temperature of boiling gamma-valerolactone, in which instance a more rapid distillation is effected. Under such conditions, a substantial quantity of gamma-valerolactone will be distilled over and the distillate will be a mixture of gamma-valerolactone and gamma-acetopropanol. Moreover, the gamma-acetopropanol will be distilled over without first decomposing into water and 2-methyl-4,5-dihydrofuran. The slow distillation is therefore preferred.

The copper chromite catalyst used in the method of the present invention may be prepared according to the method described by Calingaert and Edgar in the Journal of Industrial and Engineering Chemistry, vol. 26, pages 878-9, 1934, with the modification hereinafter described. Briefly, this process comprises dissolving 250 g. of copper sulfate pentahydrate and 125 grams of sodium dichromate dihydrate in 300 l. of water. At this point the procedure of Calingaert and Edgar is modified as follows: To the solution thus prepared is added a quantity of active silica in finely divided or colloidally dispersed form. Active silica suitable for this purpose may be in the form of a silica aerogel such as that prepared according to the methods described in U. S. 2,093,454 and U. S. 2,285,449. Silica sols such as those prepared according to the method described in U. S. 2,244,325 may also be employed. The active silica may be prepared by any desired method, for example by wet grinding of Ottawa sand to a semi-colloidal or colloidal state. The quantity of active silica which is used in preparing the catalyst for the method of the present invention may vary over a wide range. From 30% to 40% of active silica, based on the weight of the finished catalyst, has been found desirable. Lower percentages may be employed, for example 5% to 20% or lower. Likewise, higher percentages of active silica may be employed, for example 50%. However, no additional advantages are obtained thereby. An excessive quantity of active silica in the finished catalyst merely serves to dilute the catalyst without affording any further increase in yield of gamma-acetopropanol. It is an essential feature of the process of the present invention that the silica in the completed catalyst have a surface area of at least 5 square meters per gram of silica in order to accomplish the desired improved yields of gamma-acetopropanol by the process. It has been found that the stage in the preparation of the catalyst at which the active silica is incorporated does not materially alter its activity as measured in terms of surface area per gram of silica.

The aqueous solution of copper sulfate and sodium dichromate containing active silica is then processed according to the method described by Calingaert and Edgar. For example, to the aforedescribed solution, 28% ammonia is slowly added until no further precipitation occurs. The resulting slurry is filtered, the filter cake is washed with water until free from water-soluble salts, the washed cake is air dried and thereafter oven dried at 110° C. The dried cake is broken up into friable lumps and mixed with sufficient water to form a coherent mass when squeezed in the hand. The mass is then passed through a 12-mesh screen to form granules which are then roasted at 320 to 340° C. until the material is lustrous black in color and appearance, with a faint brownish cast. The material is then pulverized and screened through a 200-mesh screen. Other methods of preparing the copper chromite catalyst may be employed, the criterion being the preparation of a copper chromite catalyst containing active silica having a surface area of at least 5 square meters per gram of silica and possessing a suitable degree of activity for dehydrogenation reactions.

As an alternative in the preparation of the copper chromite-silica catalyst, the active silica may be added at a later stage in the preparation of the catalyst, for example to the washed filter cake prior to the air drying and oven drying of the cake. At this point the active silica may be in the form of a colloidal silica sol or in the form of a silica aerogel. As a further alternative, the active silica may be incorporated in the catalyst at the point at which the dried cake is broken up into friable lumps. As another alternative, active silica may be mixed with the roasted copper chromite. In this latter instance, however, the active silica incorporated in the catalyst must be employed in a dried form, since the activity of the copper chromite catalyst is impaired in the presence of water.

The following examples will serve to illustrate the process of the present invention. These examples are merely illustrative and are not to be construed as limiting the scope of the invention.

*Example I*

A mixture of 41.6 g. of 1,4-pentanediol and 0.3 g. of stearic acid was placed in a flask equipped with a stirrer, a thermometer and a condenser for downward distillation, connected to a receiver. The mixture was stirred and the system was placed under an absolute pressure of 25 mm. The mixture was heated to 90° C. and the resulting solution was cooled under reduced pressure. The system was vented and 2.0 g. of copper chromite containing 0.6 g. of silica aerogel prepared according to the methods described in U. S. 2,093,454 and U. S. 2,285,449 were added. Then the distillation receiver was connected to a bubble-counter and the mixture was heated. At about 200° C. a vigorous evolution of hydrogen occurred, and the temperature of the reaction mixture dropped to about 190° C. The reaction products were slowly distilled over, and the heating was interrupted when only a small amount of material remained in the reaction flask. The residue remaining in the flask was allowed to cool below 50° C. Then another charge of 41.6 g. of 1,4-pentanediol was introduced into the flask, and the process was continued as before. After five cycles as outlined hereinbefore had been completed, the distillate was transferred to a still. The products which constitute the distillate from the reaction flask were then distilled, the temperature of the still being allowed to rise gradually to 205° C. while the column head temperature was maintained below 110° C. The resulting distillate weighed 78.7 g. and consisted of two layers, a lower water layer and an upper layer of 2-methyl-4,5-dihydrofuran. The product was permitted to remain at room temperature with occasional shaking until a homogeneous solution was obtained (about 36 to 48 hours). Then the product was placed in a still and distilled under reduced pressure. Yield, 59.7 g. (39.8%) of gamma-acetopropanol, calculated on the 1,4-pentanediol consumed. Boiling point, 85 to 86° C./10 mm.

The high boiling residue remaining after the distillation of gamma-acetopropanol from the mixture of reaction products was distilled under reduced pressure, yielding 41.7 g. of gamma-valerolactone, boiling point, 84 to 88° C./13.5 mm., and 66.5 g. of unreacted 1,4-pentanediol, boiling point, 120 to 121° C./14 mm.

The above procedure was repeated using copper chromite catalysts containing respectively 0.1, 0.4, 0.8 and 1.0 grams of silica aerogel incorporated in the catalyst prior to drying and roasting of the catalyst, with resulting yields of gamma-acetopropanol substantially the same as in the above procedure.

In place of the stearic acid employed in the above procedure other acids may be employed, for example, sulfuric, acetic, lauric, sebacic, caproic, 2-ethyl hexoic and phenyl acetic acids. The yields of gamma-acetopropanol are essentially the same as the yield obtained when stearic acid was used.

*Example II*

A mixture of 41.6 g. of 1,4-pentanediol and 2.0 g. of copper chromite catalyst containing 0.7 gram of active silica gel, derived by evaporating to dryness an ion-deplenished silica sol and incorporating the resulting silica gel in the catalyst subsequent to the roasting operation, was heated at about 195° C., and the dehydrogenation product was distilled out slowly. When only a small amount of material was left in the flask, the heating was interrupted and the flask with its contents was permitted to cool below 50° C. An additional quantity of 41.6 g. of 1,4-pentanediol was added to the reaction vessel, and the heating was repeated as before. The crude product distillate was placed in a still, and the gamma-acetopropanol component was distilled out at atmospheric pressure to a final still temperature of 205° C. Weight of distillate, 37.6 g. The distillate was present in the form of two layers, an aqueous layer and a layer of 2-methyl-4,5-dihydrofuran. After about 36 hours, the two layers had coalesced, and vacuum distillation produced 29.0 g. of gamma-acetopropanol. Yield, 36.8%, calculated on the 1,4-pentanediol consumed. The residue from the distillation of the crude distillate from which the gamma-acetopropanol component was removed was further distilled under reduced pressure to yield 18.5 g. of gamma-valerolactone and 3.0 g. of 1,4-pentanediol.

In another run, in which the same proportions of reactants were employed, the distillate comprising 2-methyl-4,5-dihydrofuran and water was collected in a receiver containing 1 cc. of 1/50 normal hydrochloric acid. During the collection of the distillate, the contents of the receiver were agitated occasionally. In each instance after agitation of the receiver, a homogeneous solution appeared to be formed in the receiver, indicating the rapid reaction of 2-methyl-4,5-dihydrofuran and water to reform gamma-acetopropanol in the presence of the small portion of acid. This operation thereby eliminated the necessity for a 36-hour stand-over as practiced in the preceding run.

We claim:

1. The method of preparing gamma-acetopropanol and gamma-valerolactone comprising heating 1,4-pentanediol in the presence of a catalyst consisting of copper chromite and active silica, simultaneously recovering a crude mixture of reaction products from the reaction mixture, subsequently recovering a mixture of 2-methyl-4,5-dihydrofuran and water from said reaction products, allowing said mixture to stand until gamma-acetopropanol is formed in said mixture, recovering gamma-acetopropanol from said mixture, and subsequently recovering gamma-valerolactone from the residue of said crude mixture of reaction products, said active silica having a surface area of at least five square meters per gram of silica.

2. The method of preparing gamma-acetopropanol and gamma-valerolactone comprising heating 1,4-pentanediol in the presence of a catalyst consisting of copper chromite and active silica, simultaneously distilling off a crude mixture of reaction products from the reaction mixture, subsequently redistilling said crude mixture with a vapor temperature below 110° C. to recover a mixture of 2-methyl-4,5-dihydrofuran and water, allowing said mixture to stand until a homogeneous solution is formed, distilling said mixture under reduced pressure to recover gamma-acetopropanol, and subsequently recovering gamma-valerolactone from the residue remaining after the redistillation of the crude mixture, said active silica having a surface area of at least five square meters per gram of silica.

3. The method of preparing gamma-acetopropanol comprising heating 1,4-pentanediol in the presence of a catalyst consisting of copper chromite and active silica, simultaneously distilling off a crude mixture of reaction products from the reaction mixture, subsequently redistilling said crude mixture with a vapor temperature below 110° C., allowing the resulting distillate to stand until a homogeneous solution is formed, and recovering gamma-acetopropanol from said solution, said active silica having a surface area of at least five square meters per gram of silica.

4. The method of preparing gamma-acetopropanol comprising heating 1,4-pentanediol in the presence of a catalyst consisting of copper chromite and active silica, simultaneously distilling off a crude mixture of reaction products from the reaction mixture, subsequently redistilling said crude mixture with a vapor temperature below 110° C., allowing the resulting distillate to stand until a homogeneous solution is formed, and distilling gamma-acetopropanol from said solution under reduced pressure, said active silica having a surface area of at least five square meters per gram of silica.

5. The method of preparing gamma-acetopropanol comprising heating 1,4-pentanediol in the presence of a catalyst consisting of copper chromite and active silica, simultaneously distilling off a crude mixture of reaction products from the reaction mixture, subsequently redistilling said crude mixture with a vapor temperature below 110° C., allowing the resulting distillate to stand until a homogeneous solution is formed, and distilling gamma-acetopropanol from said solution under reduced pressure, said active silica having a surface area of at least five square meters per gram of silica.

6. In the method of preparing gamma-acetopropanol from 1,4-pentanediol, the step comprising heating 1,4-pentanediol with a catalyst consisting of copper chromite and active silica, said active silica having a surface area of at least five square meters per gram of silica.

7. In the method of preparing gamma-acetopropanol from 1,4-pentanediol, the step comprising heating 1,4-pentanediol with a catalyst consisting of copper chromite and 30 to 40% of active silica, based on the weight of the combined copper chromite and silica, said active silica having a surface area of at least five square meters per gram of silica.

8. In the method of preparing gamma-acetopropanol from 1,4-pentanediol, the step comprising heating 1,4-pentanediol with a catalyst consisting of copper chromite and 5 to 50% of active silica, based on the weight of the combined copper chromite and silica, said active silica having a surface area of at least five square meters per gram of silica.

9. The method of claim 1 in which a small portion of an acid is incorporated with the 1,4-pentanediol prior to the addition of the catalyst.

10. The method of claim 6 in which a small portion of an acid is incorporated with the 1,4-pentanediol prior to the addition of the catalyst.

11. The method of preparing gamma-acetopropanol and gamma-valerolactone comprising heating 1,4-pentanediol in the presence of a catalyst consisting of copper chromite and active silica, simultaneously recovering a crude mixture of reaction products from the reaction mixture, subsequently recovering a mixture of 2-methyl-4,5-dihydrofuran and water from said reaction products, allowing said mixture to stand until gamma-acetopropanol is formed in said mixture, and subsequently recovering gamma-valerolactone from the residue of said crude mixture of reaction products, said active silica having a surface area of at least five square meters per gram of silica.

12. The method of preparing gamma-acetopropanol and gamma-valerolactone comprising heating 1,4-pentanediol in the presence of a catalyst consisting of copper chromite and active silica, simultaneously distilling off a crude mixture of reaction products from the reaction mixture, subsequently redistilling said crude mixture with a vapor temperature below the vapor temperature of boiling gamma-valerolactone, allowing the resulting distillate mixture to stand until a homogeneous solution is formed, distilling said mixture under reduced pressure to recover gamma-acetopropanol, and subsequently recovering gamma-valerolactone and finally residual unreacted 1,4-pentanediol from the residue remaining after the redistillation of the crude mixture, said active silica having a surface area of at least five square meters per gram of silica.

13. The method of preparing gamma-acetopropanol and gamma-valerolactone comprising heating 1,4-pentanediol in the presence of a catalyst consisting of copper chromite and active silica, simultaneously distilling off a crude mixture of reaction products from the reaction mixture, subsequently redistilling said crude mixture with a vapor temperature below 110° C., collecting the distillate in the presence of a small portion of an acid, redistilling said distillate under reduced pressure to recover gamma-acetopropanol, and subsequently recovering gamma-valerolactone from the residue remaining after the redistillation of the crude mixture, said active silica having a surface area of at least five square meters per gram of silica.

14. The method of preparing gamma-acetopropanol and gamma-valerolactone comprising heating 1,4-pentanediol in the presence of a catalyst consisting of copper chromite and active silica, simultaneously distilling off a crude mixture of reaction products from the reaction mixture, subsequently redistilling said crude mixture with a vapor temperature below 110° C., collecting the distillate and adding a small portion of acid to said distillate, allowing said mixture to stand until a homogeneous solution is formed, distilling said mixture under reduced pressure to recover gamma-acetopropanol and subsequently recovering gamma-valerolactone from the residue remaining after the redistillation of the crude mixture, said active silica having a surface area of at least five square meters per gram of silica.

15. In the method of preparing gamma-acetopropanol from 1,4-pentanediol, the steps comprising heating 1,4-pentanediol under reduced pressure for a short period of time, cooling the material, adding at atmospheric pressure a catalyst consisting of copper chromite and active silica and heating the resulting mixture, said active silica having a surface area of at least five square meters per gram of silica.

16. In the method of preparing gamma-acetopropanol from 1,4-pentanediol, the steps comprising heating 1,4-pentanediol with a catalyst consisting of copper chromite and active silica, distilling off a crude mixture of gamma-acetopropanol and gamma-valerolactone and recovering gamma-acetopropanol from said mixture, said active silica having a surface area of at least five square meters per gram of silica.

17. In the method of preparing a mixture of gamma-acetopropanol and gamma-valerolactone from 1,4-pentanediol, the steps comprising heating 1,4-pentanediol with a catalyst consisting of copper chromite and active silica, and recovering a mixture of gamma-acetopropanol and gamma-valerolactone from the reaction mixture, said active silica having a surface area of at least five square meters per gram of silica.

18. In the method of preparing gamma-acetopropanol from 1,4-pentanediol, the step comprising heating 1,4-pentanediol with a catalyst consisting of copper chromite and silica gel having a surface area of at least five square meters per gram of silica.

19. In the method of preparing gamma-acetopropanol from 1,4-pentanediol, the step comprising heating 1,4-pentanediol with a catalyst consisting of copper chromite and silica aerogel having a surface area of at least five square meters per gram of silica.

20. In the method of preparing gamma-acetopropanol from 1,4-pentanediol, the step comprising heating 1,4-pentanediol with a catalyst consisting of copper chromite and silica aerogel having a surface area of at least 200 square meters per gram of silica.

LUCAS P. KYRIDES.
FERDINAND B. ZIENTY.

REFERENCES CITED

The following references are of record in the file of this patent:

UNITED STATES PATENTS

| Number | Name | Date |
| --- | --- | --- |
| 1,955,882 | Hilger | Apr. 24, 1934 |
| 2,036,940 | Holmes | Apr. 7, 1936 |
| 2,143,383 | McNamee | Jan. 10, 1939 |
| 2,382,071 | Kyrides | Aug. 14, 1945 |